United States Patent
Chen et al.

(10) Patent No.: US 8,254,099 B2
(45) Date of Patent: Aug. 28, 2012

(54) HOUSING OF PORTABLE ELECTRONIC DEVICE

(75) Inventors: Jian-Hui Chen, Shenzhen (CN); Ji Zhou, Shenzhen (CN); Ming-Zhi Zheng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 176 days.

(21) Appl. No.: 12/862,852

(22) Filed: Aug. 25, 2010

(65) Prior Publication Data

US 2011/0228454 A1    Sep. 22, 2011

(30) Foreign Application Priority Data

Mar. 19, 2010 (CN) .......................... 2010 1 0127313

(51) Int. Cl.
    *H05K 5/00*    (2006.01)
    *H05K 7/00*    (2006.01)
(52) U.S. Cl. ........... 361/679.02; 361/679.3; 361/679.55; 361/679.56

(58) Field of Classification Search ............. 361/679.02, 361/679.3, 679.55, 679.56
See application file for complete search history.

(56) References Cited

U.S. PATENT DOCUMENTS

| | | | | |
|---|---|---|---|---|
| 5,659,376 A * | 8/1997 | Uehara et al. | ................... | 349/58 |
| 6,031,524 A * | 2/2000 | Kunert | ........................ | 345/173 |
| 6,532,152 B1 * | 3/2003 | White et al. | ................... | 361/692 |
| 6,842,333 B2 * | 1/2005 | Lee et al. | ................. | 361/679.55 |
| 2004/0114318 A1 * | 6/2004 | Nuovo et al. | ................. | 361/683 |
| 2006/0133018 A1 * | 6/2006 | Okuda | ......................... | 361/681 |

* cited by examiner

*Primary Examiner* — Anthony Haughton
(74) *Attorney, Agent, or Firm* — Altis Law Group, Inc.

(57) ABSTRACT

A housing of a portable electronic device includes a main body, a cover assembled to the main body, and a protecting member positioned between the main body and the cover and integral with the main body. A part of the protecting member forms a protruding first protection surface and a sunken second protection surface, a transition surface between the first protection surface and the second protection surface defines a third protection surface, and a protection flange is formed on the second protection surface. The first protection surface and the third protection surface tightly contact the cover to form a protection structure that prevents outside contamination from entering the housing, and the protection flange prevents contamination that passes through the protection structure from further entering the housing.

15 Claims, 4 Drawing Sheets

HOUSING OF PORTABLE ELECTRONIC DEVICE

BACKGROUND

1. Technical Field

The present disclosure relates to housings of portable electronic devices, and particularly to a waterproof housing of a portable electronic device.

2. Description of Related Art

Portable electronic devices, such as mobile phones, personal digital assistants (PDA), and laptop computers, are widely used. Many portable electronic devices have waterproof structures for preventing outside contamination, such as water, vapor and dust, from entering their inner space and damaging their inner components. Most conventional waterproof structures used in portable electronic devices are elastic gaskets. The elastic gaskets are generally received in housings of the portable electronic devices, and engage with gaps formed in the housings that block the gaps due to their elasticity. However, these elastic gaskets occupy inner space of the portable electronic devices, which may adversely affect miniaturization of the portable electronic devices.

Therefore, there is room for improvement within the art.

BRIEF DESCRIPTION OF THE DRAWINGS

Many aspects of the present housing of a portable electronic device can be better understood with reference to the following drawings. The components in the various drawings are not necessarily drawn to scale, the emphasis instead being placed upon clearly illustrating the principles of the present housing of a portable electronic device. Moreover, in the drawings, like reference numerals designate corresponding parts throughout the figures.

DETAILED DESCRIPTION

Figure 1:
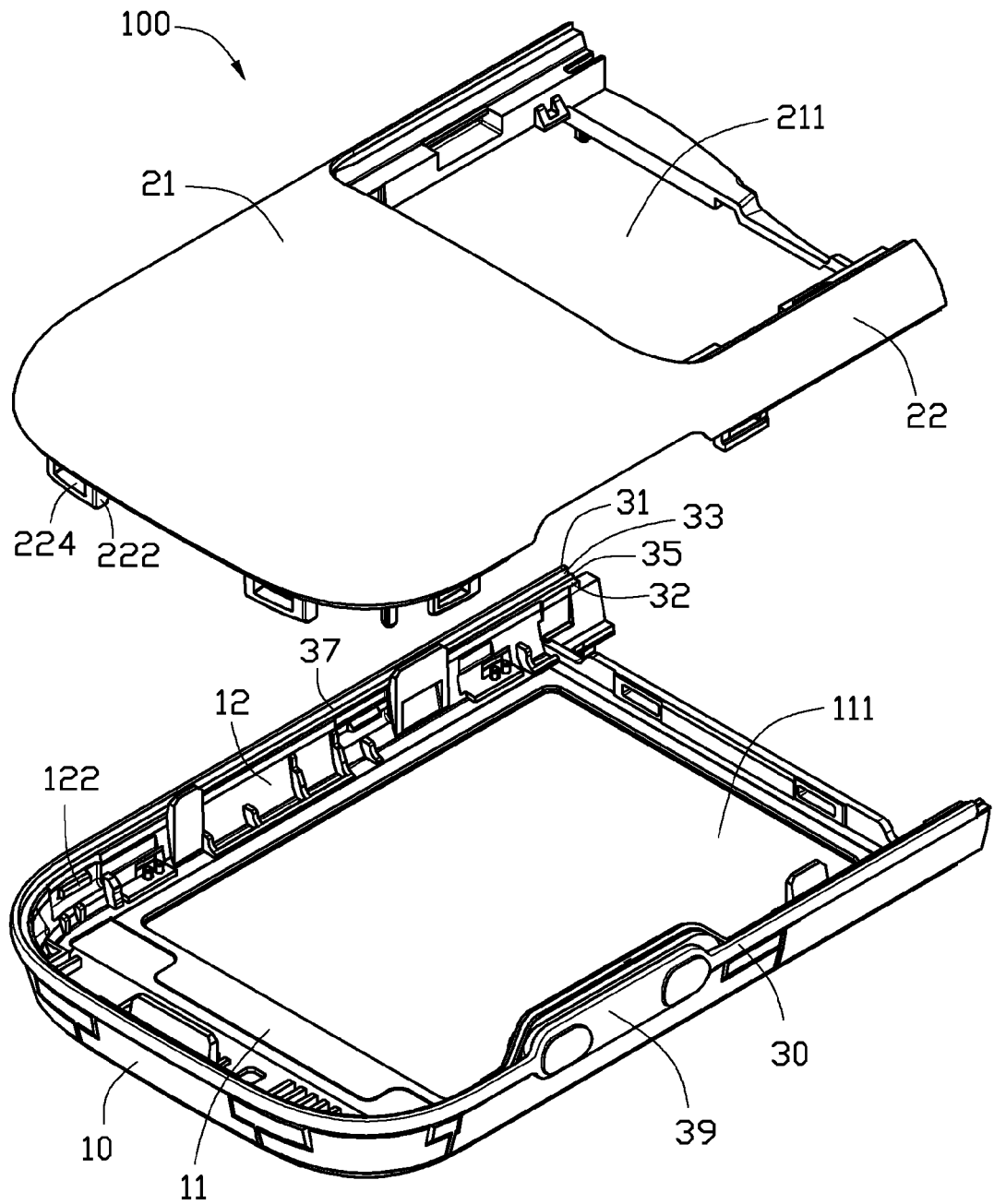
FIG. 1 is a schematic view of a housing of portable electronic devices, according to a first exemplary embodiment, with a cover thereof detached.

FIG. 1 shows a housing 100, according to an exemplary embodiment. The housing 100 can be used in a portable electronic device, such as a mobile phone, a personal digital assistant (PDA), or MP3/MP4 players. Also referring to FIG. 4, the housing 100 includes a main body 10, a cover 20, and a protecting member 30. The protecting member 30 is integral with the main body 10 because the protecting member 30 and the main body 10 are formed in the same mold, during a molding process. The cover 20 can be assembled to the main body 10 to cover the main body 10. When the cover 20 is assembled to the main body 10, the protecting member 30 is positioned between the main body 10 and the cover 20 to seal a gap formed between the main body 10 and the cover 20, thereby preventing outside contamination, such as water, vapor and dust, from entering the housing 100.

The main body 10 includes a first panel 11 and a first sidewall 12. The first panel 11 is a planar board defining a display hole 111 in a central portion thereof. The display hole 111 can receive a display module (not shown) of the portable electronic device. The first sidewall 12 is a substantially U-shaped frame connected to a peripheral portion of the first panel 11. A number of assembling members 122 are formed on an inner side of the first sidewall 12. The assembling members 122 are substantially bar-shaped protrusions extending substantially parallel to the first panel 11. Each assembling member 122 has a side connected to the inner side of the first sidewall 12.

Figure 2:
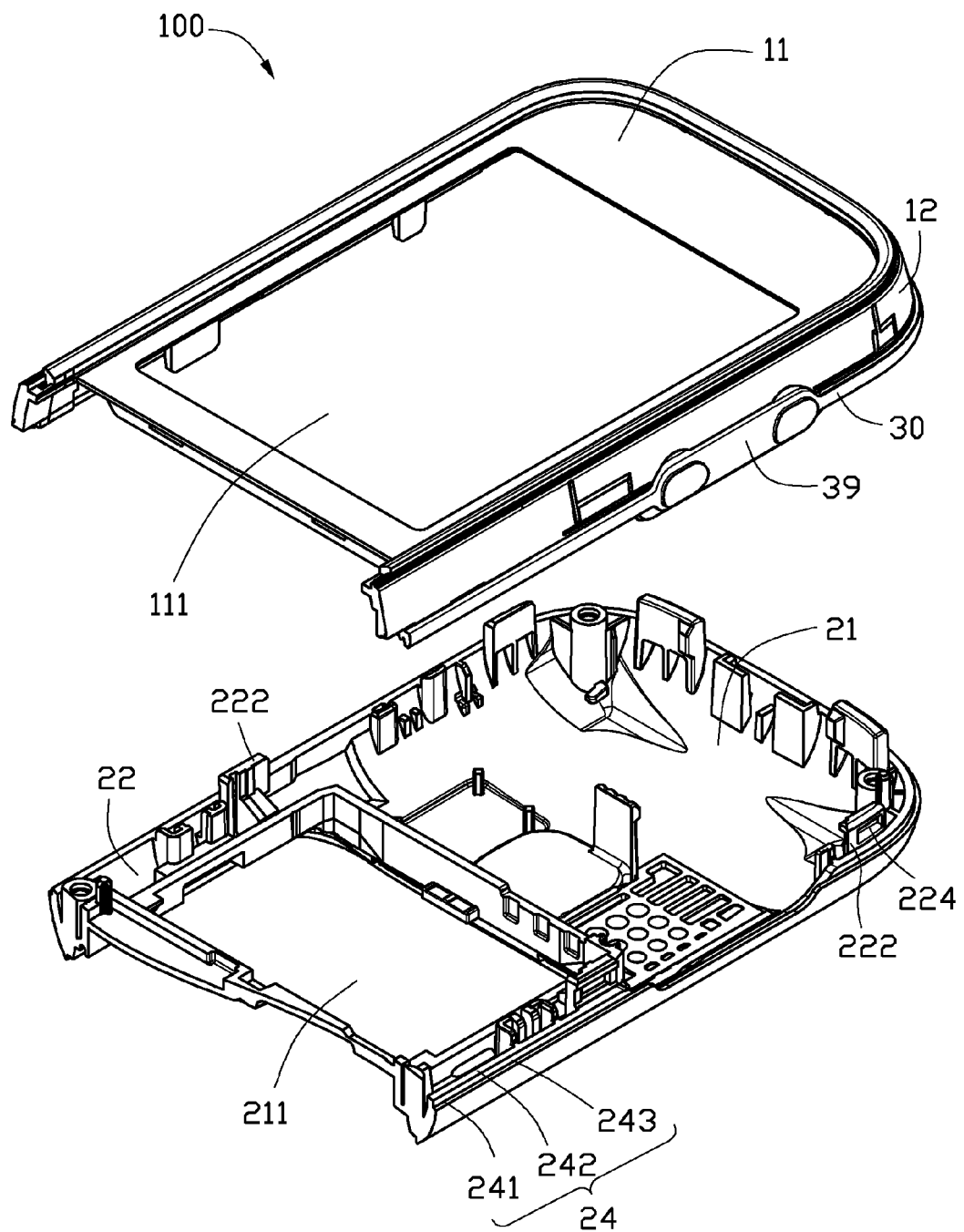
FIG. 2 is a similar to FIG. 1, but shown from another viewing angle.

Also referring to FIG. 2, the cover 20 includes a second panel 21 and a second sidewall 22. The second panel 21 is a planar board defining a battery hole 211 in an end thereof. The battery hole 211 can receive a battery (not shown) of the portable electronic device. The second sidewall 22 is a substantially U-shaped frame connected to a peripheral portion of the second panel 21. The shape and size of the second panel 21 and the second sidewall 22 correspond respectively to the shape and size of the first panel 11 and the second sidewall 12. A number of retaining members 222 corresponding to the assembling members 122 are formed on an inner side the second sidewall 22. The retaining members 222 are substantially cube-shaped protrusions. Each retaining member 222 has a side connected to the inner side of the second sidewall 22. Each retaining member 222 defines an assembling groove 224 on an outer side thereof. The shape and size of the assembling groove 224 corresponds to the shape and size of the assembling members 122. The assembling members 122 can be respectively received in the assembling grooves 224 to engage with the retaining members 22, thereby assembling the cover 20 to the main body 10.

The second sidewall 22 further includes a contact area 24. The contact area 24 is formed on an edge of the second sidewall 22 that is opposite to the second panel 21. The contact area 24 includes a sunken first contact surface 241, a protruding second contact surface 242, and a third contact surface 243. In this exemplary embodiment, a peripheral portion of the edge lowers towards the first panel 21 to form the first contact surface 241, and the rest of the edge that is adjacent to the internal side of the second sidewall 22 forms the second contact surface 242. A transition surface is formed between the first contact surface 241 and the second contact surface 242 and defines the third contact surface 243.

The protection member 30 is a substantially U-shaped frame made of elastic material. The shape and size of the protection member 30 are configured to correspond to the shape and size of the first sidewall 12 and the second sidewall 22. To enable the cover 20 to be assembled to the main body 10, a width of the protection member 30 is larger than a distance between the first sidewall 12 and the second sidewall 22. One edge of the protection member 30 is integral with an edge of the first sidewall 12, and a gap between the protection member 30 and the first side wall 12 is entirely sealed. All assembling members 122 are positioned at an inner side of the protection member 30, therefore, the protection member 30 surrounds the assembling members 122. A protruding first protection surface 31, a sunken second protection surface 32, a third protection surface 33, and a protection flange 35 are formed on another edge of the protection member 30 that is opposite to the first sidewall 12. In this exemplary embodiment, a part of the another edge that is adjacent to the inner side of the protection member 30 lowers towards the first panel 10 to form the second protection surface 32, and the peripheral portion of the edge forms the first protection surface 31. A transition surface is formed between the first protection surface 31 and the second protection surface 32 and defines the third protection surface 33. The shapes and sizes of the first protection surface 31, the second protection surface 32, and the third protection surface 33 respectively correspond to the shapes and sizes of the first contact surface 241, the second contact surface 242, and the third contact surface 243.

The protection flange 35 is formed on the second protection surface 32. The shape of the protection flange 35 corresponds to the shapes of the first protection surface 31 and the second protection surface 33. The protection flange 35 is configured to separate from the third protection surface 33, and thus a protection gap 37 is formed between the protection flange 35 and the third protection surface 33.

Figure 3:
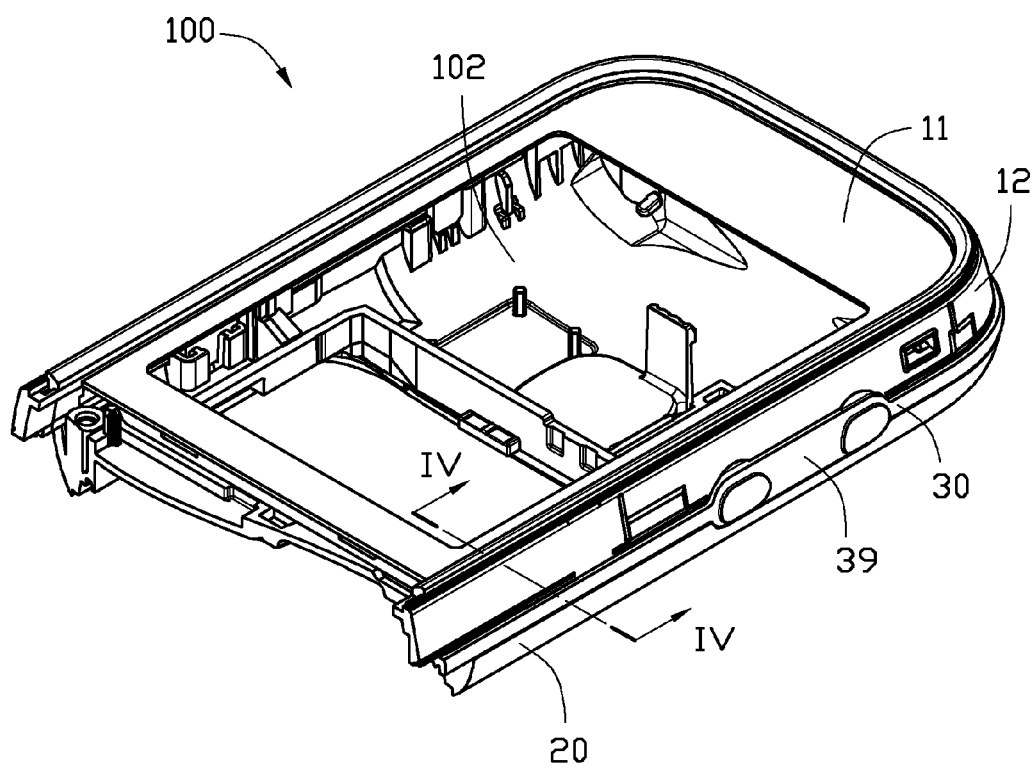
FIG. 3 is an assembled view of the housing shown in FIG. 1.
Figure 4:
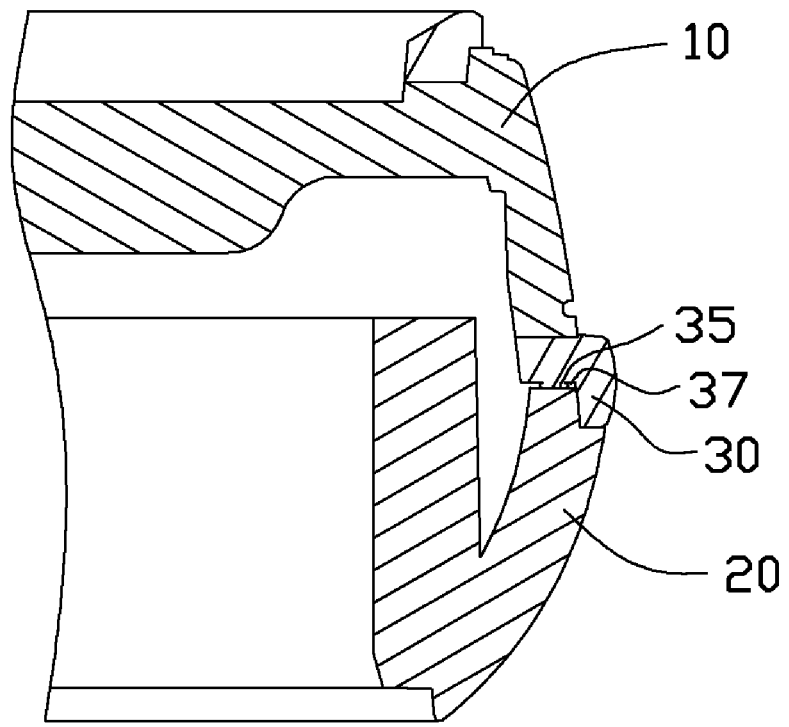
FIG. 4 is a cutaway view along the line IV-IV shown in FIG. 3.

Also referring to FIG. 3 and FIG. 4, when the cover 20 is assembled to the main body 10, the first contact surface 241 and the second contact surface 242 are respectively aligned with the first protection surface 31 and the second protection device 32, and the assembling members 122 are respectively aligned with their corresponding retaining members 222. The cover 20 is pressed towards the main body 10. A side of each retaining member 222 that is opposite to the second panel 21 is pushed to slide across a corresponding assembling member 122, and thus the assembling member 122 is received in the assembling groove 224 of the retaining member 222 and engages with the retaining member 222. In this way, each assembling member 122 is received in the assembling groove 224 of its corresponding retaining member 222 to engage with the retaining member 122. The cover 20 is then assembled to the main body 10, and the protecting member 30 is positioned between the main body 10 and the cover 20 and surrounds the assembling members 122 and the retaining members 222. Thus, the assembly of the housing 100 is complete. A main receiving space 102 is formed between the main body 10 and the cover 20. The main receiving space 102 is surrounded by the assembling member 122 and the retaining member 222. In use, most inner components of the portable electronic device are received in the main receiving space 102.

In the assembled housing 100, since the width of the protecting member 30 is larger than the distance between the first sidewall 12 and the second sidewall 22, the first protection surface 31, the protection flange 35, and the third protection surface 33 are respectively pressed to tightly contact the first contact surface 241, the second contact surface 242, and the third contact surface 243, due to elasticity of the protecting member 30. The first protection surface 31 and the third protection surface 33 tightly contact the first contact portion 241 and the third contact portion 242 to prevent outside contamination, such as water, vapor, and dust, from entering the housing 100. Thus, the first protection surface 31, the first contact surface 241, the third protection surface 33, and the third contact surface 243 cooperatively form a first protection structure. Furthermore, if some contamination passes through the first protection structure, they are received in the protection gap 37. The protection flange 35 tightly contacting the second contact surface 242 can prevent the contamination received in the protection gap 37 from further entering the main receiving space 102. Additionally, when water is received in the protection gap 37, it can be absorbed in the protection gap 37 due to its surface tension, and thus it is prevented from flowing into the main receiving space 102. Thus, the protection gap 37 and the protection flange 35 cooperatively form a second protection structure.

As detailed above, the protecting member 30 can cooperate with the cover 20 to protect outside contamination, such as water, vapor and dust, from entering the housing 100 and damaging inner components received in the housing 100. Furthermore, since the protecting member 30 surrounds the assembling member 122 and the retaining members 222, it does not occupy the main receiving space 102 of the housing 100. Compared with conventional housings for portable electronic devices with protection gaskets received therein, the housing 100 can provide more space for receiving inner components of the portable electronic device, which is advantageous to miniaturization of the portable electronic device.

Additionally, referring to FIGS. 1-3, the protecting member 30 can include at least one button 39 formed by enlarging a width of at least one selected part thereof. The button 39 can be used for such things as a volume adjusting button, or an image capturing switch.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A housing of a portable electronic device, comprising:
a main body;
a cover assembled to the main body; and
a protecting member positioned between the main body and the cover and integral with the main body, a part of the protecting member forming a protruding first protection surface and a sunken second protection surface, a transition surface between the first protection surface and the second protection surface defining a third protection surface, and a protection flange formed on the second protection surface; wherein the first protection surface and the third protection surface tightly contact the cover to form a protection structure that prevents outside contamination from entering the housing, and the protection flange prevents contamination that passes through the protection structure from further entering the housing.

2. The housing as claimed in claim 1, wherein a protection gap is formed between the protection flange and the third protection surface, the protection gap receiving contamination that passes through the protection structure therein.

3. The housing as claimed in claim 1, wherein the cover includes a sunken first contact surface and a protruding second contact surface, a transition surface formed between the first contact surface and the second contact surface defining a third contact surface, the first protection surface, the protection flange, and the third protection surface respectively tightly contact the first contact surface, the second contact surface, and the third contact surface.

4. The housing as claimed in claim 1, wherein the protecting member is made of elastic material.

5. The housing as claimed in claim 4, wherein a width of the protecting member is larger than a distance between the cover and the main body assembled together, such that the protecting member is pressed to tightly contact with the cover due to its elasticity.

6. The housing as claimed in claim 1, wherein the main body includes a plurality of assembling members and the cover including a plurality of retaining members corresponding to the assembling members; the assembling member being protrusions; each retaining member defining an assembling groove therein, each assembling member received in the assembling groove of its corresponding retaining member to engage with the retaining member, thereby assembling the cover on the main body.

7. The housing as claimed in claim 6, wherein all assembling members and retaining members are positioned at an inner side of the protecting member.

8. The housing as claimed in claim 1, wherein the protecting member include at least one button formed by enlarging a width of at least one selected part thereof.

9. A housing of a portable electronic device, comprising:
a main body;
a cover assembled to the main body; and
a protecting member positioned between the main body and the cover and integral with the main body, the protecting member having a protruding first protection surface, a sunken second protection surface, a third protection surface between the first protection surface and the second protection surface, and a protection flange formed on the second protection surface; wherein a protection gap is formed between the protection flange and the third protection surface, the first protection surface, the third protection surface, and the protection flange tightly contacts the cover to seal the protection gap.

10. The housing as claimed in claim 9, wherein the cover includes a sunken first contact surface and a protruding second contact surface, a transition surface formed between the first contact surface and the second contact surface defining a third contact surface, the first protection surface, the protection flange, and the third protection surface respectively tightly contact the first contact surface, the second contact surface, and the third contact surface.

11. The housing as claimed in claim 9, wherein the protecting member is made of elastic material.

12. The housing as claimed in claim 11, wherein a width of the protecting member is larger than a distance between the cover and the main body assembled together, such that the protecting member is pressed to tightly contact with the cover due to its elasticity.

13. The housing as claimed in claim 9, wherein the main body includes a plurality of assembling members and the cover including a plurality of retaining members corresponding to the assembling members; the assembling member being protrusions; each retaining member defining an assembling groove therein, each assembling member received in the assembling groove of its corresponding retaining member to engage with the retaining member, thereby assembling the cover on the main body.

14. The housing as claimed in claim 13, wherein all assembling members and retaining members are positioned at an inner side of the protecting member.

15. The housing as claimed in claim 9, wherein the protecting member include at least one button formed by enlarging a width of at least one selected part thereof.

* * * * *